(12) United States Patent
Kolb et al.

(10) Patent No.: US 8,662,558 B1
(45) Date of Patent: Mar. 4, 2014

(54) VEHICLE STORAGE SYSTEM

(75) Inventors: Ryan A Kolb, Tea, SD (US); Denis Knobloch, Alvord, IA (US)

(73) Assignee: BackAlley Accessories, LLC

( * ) Notice: Subject to any disclaimer, the term of this patent is extended or adjusted under 35 U.S.C. 154(b) by 32 days.

(21) Appl. No.: 12/578,540

(22) Filed: Oct. 13, 2009

Related U.S. Application Data

(63) Continuation-in-part of application No. 12/288,556, filed on Oct. 21, 2008.

(51) Int. Cl.
    *B60R 7/00* (2006.01)
(52) U.S. Cl.
    USPC .......................... 296/37.6; 296/24.3; 224/404
(58) Field of Classification Search
    USPC ......... 296/24.3, 37.6; 224/404, 403, 547, 557
    See application file for complete search history.

(56) References Cited

U.S. PATENT DOCUMENTS

| | | | | |
|---|---|---|---|---|
| 4,752,095 A | * | 6/1988 | Brady | 296/37.6 |
| 6,422,629 B2 | * | 7/2002 | Lance et al. | 296/37.6 |
| 7,530,618 B2 | * | 5/2009 | Collins et al. | 296/37.6 |

* cited by examiner

*Primary Examiner* — Glenn Dayoan
*Assistant Examiner* — Melissa A Black
(74) *Attorney, Agent, or Firm* — Ascentage Law, PLLC; Travis L. Johnson

(57) ABSTRACT

A vehicular storage system for providing secure storage of tools, sporting goods, and other equipment while maintaining quick removal characteristics. The system includes at least one storage assembly and a mounting assembly. Each one of the storage assemblies includes a bottom wall, a perimeter wall extending upwardly from the bottom wall, and a lid portion for selectively closing at least a portion of a compartment formed by the bottom wall and the perimeter wall. The mounting assembly is designed to be coupleable to a vehicle, such as a pick-up truck, sport utility vehicle, all terrain vehicle, boat, or other suitable vehicle. The mounting assembly facilitates removably mounting the storage assembly to the vehicle.

19 Claims, 4 Drawing Sheets

VEHICLE STORAGE SYSTEM

CROSS-REFERENCE TO RELATED APPLICATIONS

This application is a continuation-in-part of application Ser. No. 12/288,556 filed on Oct. 21, 2008.

BACKGROUND OF THE INVENTION

1. Field of the Invention

The present invention relates to storage devices for pick-up trucks and similar vehicles and more particularly pertains to a new vehicular storage system for providing secure storage of tools, sporting goods, and other equipment while maintaining quick removal characteristics.

2. Description of the Prior Art

The use of storage devices for pick-up trucks and similar vehicles is known in the prior art. More specifically, storage devices for pick-up trucks and similar vehicles heretofore devised and utilized are known to consist basically of familiar, expected and obvious structural configurations, notwithstanding the myriad of designs encompassed by the crowded prior art which have been developed for the fulfillment of countless objectives and requirements.

The prior art storage devices for pick-up trucks includes U.S. Pat. Nos. 5,964,492; 7,111,884; 6,921,492; 4,266,821; and 5,088,636. Many of these and similar devices provide storage for the user, but may limit the user's ability to use a Tourneau cover, topper, or other accessories for their vehicle, reduce the ability to use the full extent of the bed of the vehicle, or effectively advertise that the vehicle has a tool box making it a candidate for theft.

In these respects, the vehicular storage system according to the present invention substantially departs from the conventional concepts and designs of the prior art, and in so doing provides an apparatus primarily developed for the purpose of providing secure storage of tools, sporting goods, and other equipment while maintaining quick removal characteristics.

SUMMARY OF THE INVENTION

In view of the foregoing disadvantages inherent in the known types of storage devices for pick-up trucks and similar vehicles now present in the prior art, the present invention provides a new Vehicular Storage System construction wherein the same can be utilized for providing secure storage of tools, sporting goods, and other equipment while maintaining quick removal characteristics.

To attain this, the present invention generally comprises at least one storage assembly and a mounting assembly. Each one of the storage assemblies includes a bottom wall, a perimeter wall extending upwardly from the bottom wall, and a lid portion for selectively closing at least a portion of a compartment formed by the bottom wall and the perimeter wall. The mounting assembly is designed to be coupleable to a vehicle, such as a pick-up truck, sport utility vehicle, all terrain vehicle, boat, or other suitable vehicle. The mounting assembly facilitates removably mounting the storage assembly to the vehicle. In the case of pick-up trucks and sport utility vehicles, the mounting assembly may be attached adjacent to a conventional tailgate of the vehicle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

One significant advantage of the present invention is the ability to configure individual accessory assemblies for specific needs, and be able to quickly change out the assemblies to meet the current need of the user.

Another significant advantage is the ability for the user to still be able to use a Tourneau cover or topper to conceal the storage assembly and thereby reduce the likelihood of theft.

Further advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein.

DESCRIPTION OF PREFERRED EMBODIMENTS

Figure 1:
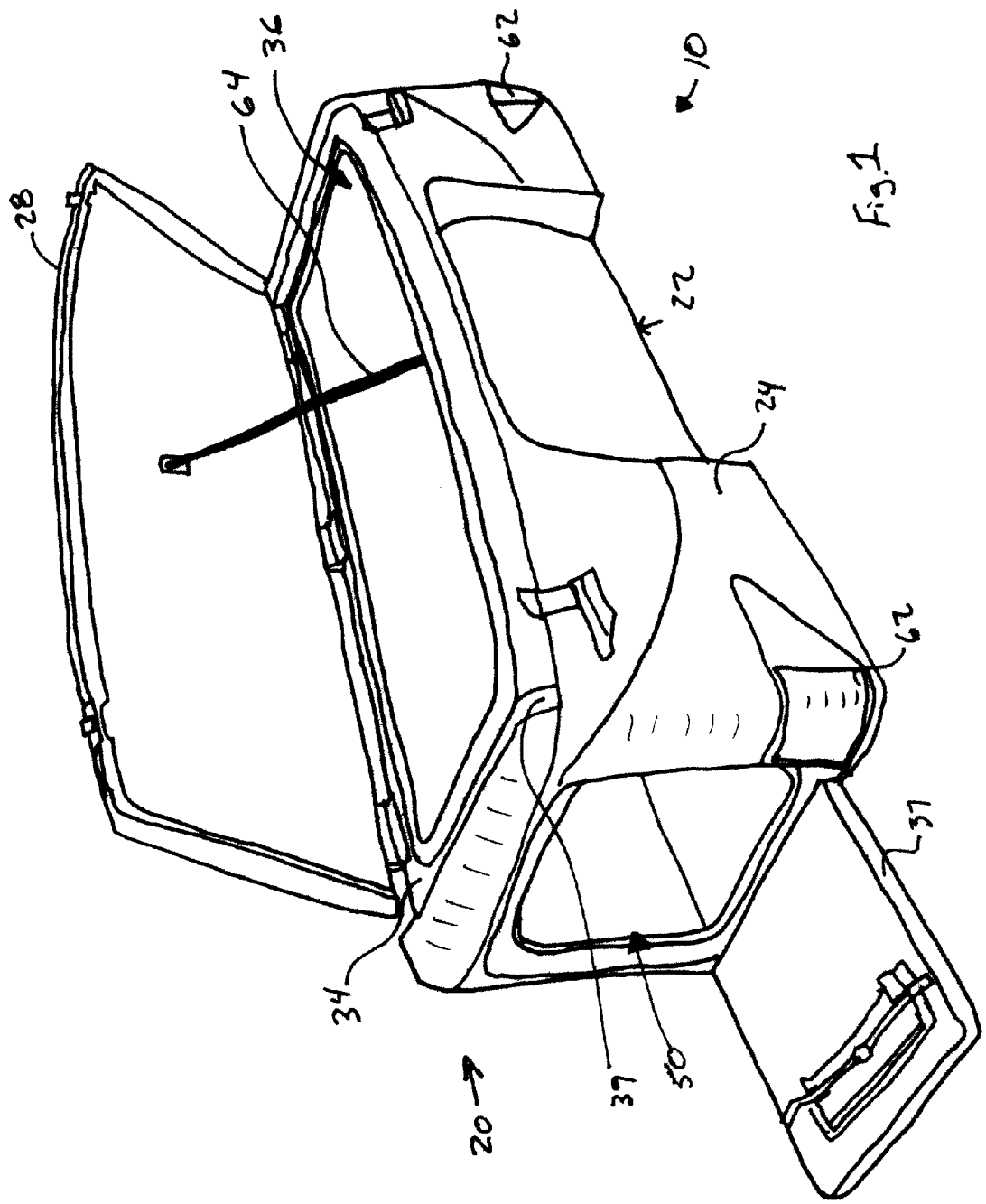
FIG. 1 is a schematic perspective view of a new Vehicular Storage System according to the present invention.
Figure 2:
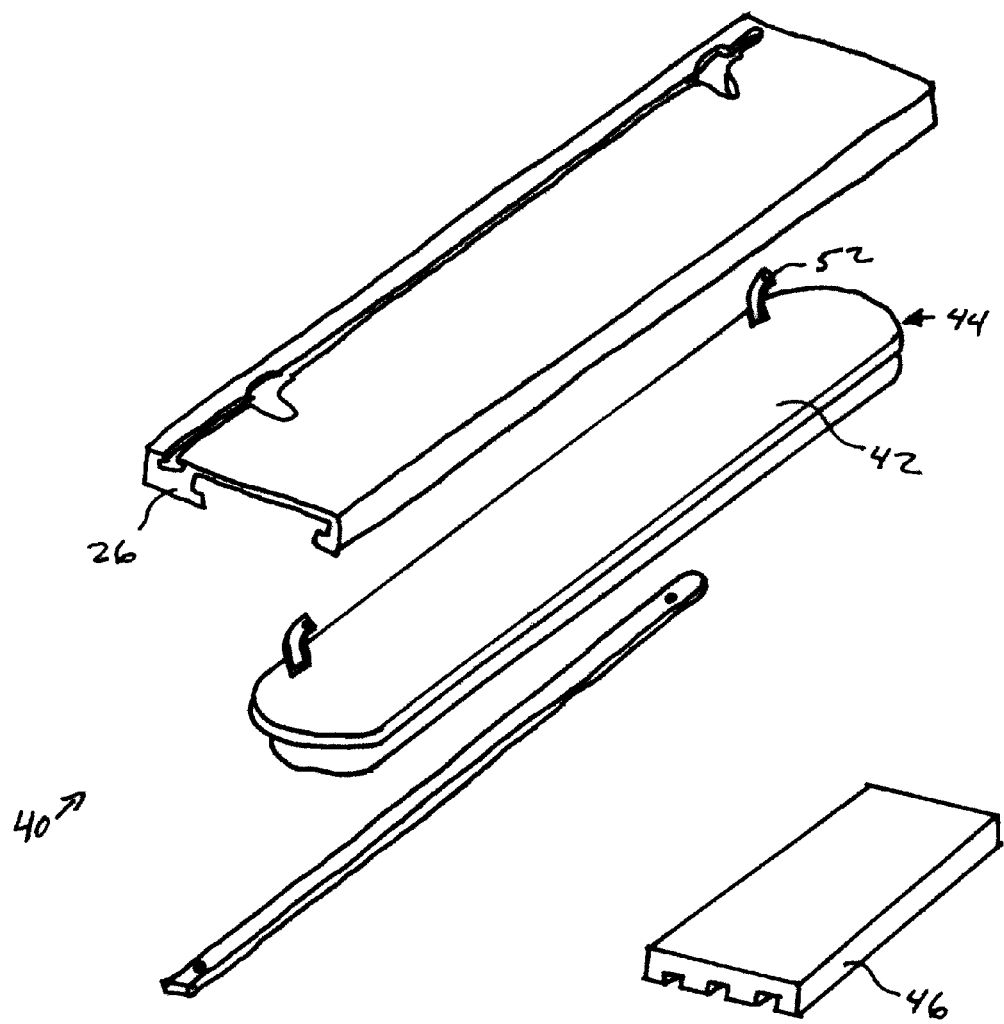
FIG. 2 is a schematic front view of the mounting assembly of the present invention.
Figure 3:
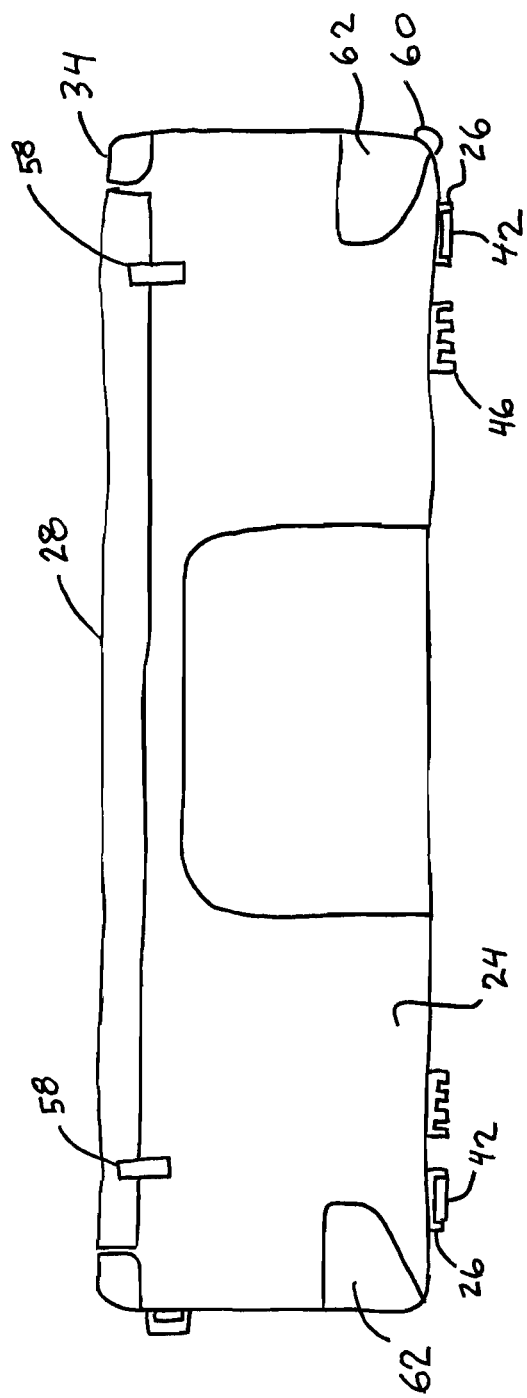
FIG. 3 is a schematic front view of the present invention.
Figure 4:
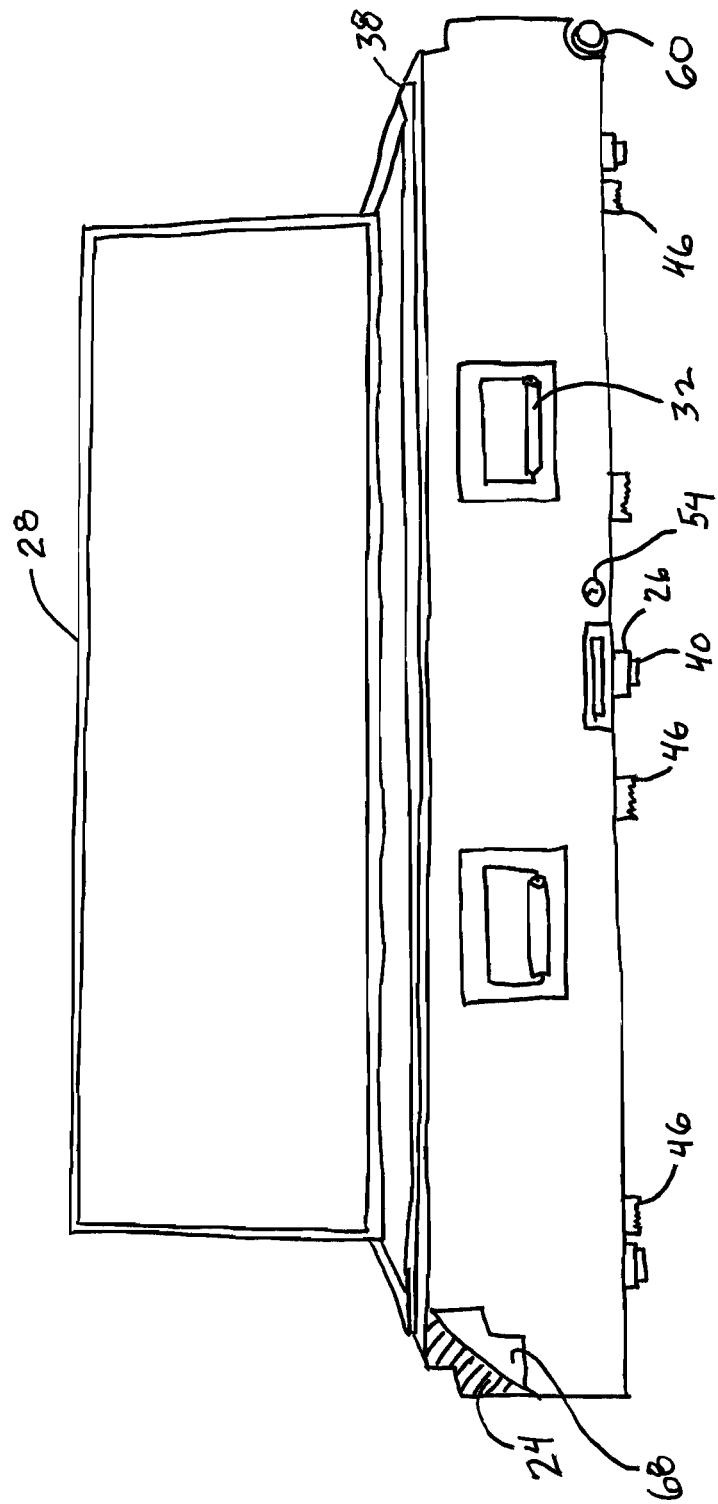
FIG. 4 is a schematic perspective view of an alternate configuration of the present invention.

With reference now to the drawings, and in particular to FIGS. 1 through 6 thereof, a new vehicular storage system embodying the principles and concepts of the present invention and generally designated by the reference numeral 10 will be described.

As best illustrated in FIGS. 1 through 6, the Vehicular Storage System 10 generally comprises at least one storage assembly 20 and a mounting assembly 40. Each one of the storage assemblies 20 includes a bottom wall 22, a perimeter wall 24 extending upwardly from the bottom wall 22, and a lid portion 28 for selectively closing at least a portion of a compartment formed by the bottom wall 22 and the perimeter wall 24. The mounting assembly 40 is designed to be coupleable to a vehicle, such as a pick-up truck, sport utility vehicle, all terrain vehicle, boat, or other suitable vehicle. The mounting assembly 40 facilitates removably mounting the storage assembly 20 to the vehicle.

The storage assembly 20 typically includes a bottom wall 22, a perimeter wall 24 which extends upward from the bottom wall 22, and a lid portion for selectively closing at least a portion of a compartment formed by the bottom wall 22 and the perimeter wall 24.

The mounting assembly 40 may be coupled to a vehicle to facilitate removably mounting the storage assembly 20 to the vehicle.

In an embodiment the mounting assembly 40 further includes a pair of mounting members 42. Each one of the pair of mounting members 42 is coupled to the bed of the vehicle. The storage assembly 20 further includes a pair of receiving members 26 positioned on the bottom wall 22. Each one of the receiving members 26 may be selectively coupled to an associated one of the pair of mounting members 42. The mounting assembly may also include at least one skid member 46 for facilitating sliding the storage assembly onto the mounting assembly and providing a spacing above the vehicle bed.

In a further embodiment the system also includes at least one latching means 52, a latch release 58 and at least one latch locking means 54. Each one of the latching means 52 is positioned substantially within an associated end of the mounting assembly 40 for selectively securing the storage assembly 20 to the mounting assembly 40. The latch release 58 is preferably operationally coupled to the latching means 52 for selectively releasing the latching means 52. The latch locking means 54 is used for selectively locking the latching means 52. Thus, the storage assembly 20 maybe locked onto the mounting assembly 40.

In still a further embodiment, the one latching means 52 have a first secured position and a second secured position, whereby the storage assembly 20 is positionable in a first position and a second position along the mounting member 42.

In an embodiment each one of the mounting members 42 further includes a tapered leading edge 44. The tapered leading edge 44 assists with the alignment of the storage assembly 20 onto the mounting assembly 40.

In yet a further embodiment, the storage assembly 20 also includes a pair of wheels. Each one of the pair of wheels is positioned along one end of the storage assembly 20 and along an associated side of the storage assembly 20.

In still a further embodiment, the storage assembly 20 also includes a pair of reflective elements 62. Each one of the pair of reflective elements 62 is positioned adjacent to an associated corner of the storage assembly 20.

In at least one embodiment, the storage assembly 20 is made from a polymeric material.

In an embodiment the storage assembly 20 further includes an aperture extending through a portion of the perimeter wall 24, a door adapted for selectively closing the aperture operationally coupled to the perimeter wall 24, and a door latching system for selectively securing the door.

In an embodiment the lid portion further includes a top wall 34 operationally coupled to the perimeter wall 24, a top aperture 36 positioned through the top wall, a lip portion 30 extending upwardly from the top wall 34 adjacent to the top aperture 36, a seal member 38 positioned along the lip portion 30, and a lid member pivotally coupled to the storage assembly 20.

In a further embodiment, the lid portion also includes a channel member 39 positioned in the top wall 34 adjacent to the lip portion 30. The channel member 39 directs water away from the top aperture 36.

The storage assembly 20 may also include a prop member 64 positionable between the lid member and either the top wall or the perimeter wall 24. The prop member 64 assists in holding the lid member in an open position.

The storage assembly 20 may also include a wrap portion 68 positioned on an exterior surface of the storage assembly 20. The wrap portion 68 may provide protection from abrasions to the storage assembly 20 or may provide a decorative element.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

| Index of Elements for Vehicular Storage System | |
|---|---|
| 10. | Vehicular Storage System |
| 11. | |
| 12. | |
| 13. | |
| 14. | |
| 15. | |
| 16. | |
| 17. | |
| 18. | |
| 19. | |
| 20. | Storage Assembly |
| 21. | |
| 22. | Bottom Wall |
| 23. | |
| 24. | Perimeter Wall |
| 25. | |
| 26. | Receiving Members |
| 27. | |
| 28. | Lid Portion |
| 29. | |
| 30. | Lip Portion |
| 31. | |
| 32. | Handle Member |
| 33. | |
| 34. | Top Wall |
| 35. | |
| 36. | Top Aperture |
| 37. | |
| 38. | Seal Member |
| 39. | |
| 40. | Mounting Assembly |
| 41. | |
| 42. | Mounting Member |
| 43. | |
| 44. | Tapered Edge |
| 45. | |
| 46. | |
| 47. | |
| 48. | |
| 49. | |
| 50. | Aperture |
| 51. | |
| 52. | Latching Means |
| 53. | |
| 54. | Latch locking Means |
| 55. | |
| 56. | |

-continued

| Index of Elements for Vehicular Storage System | |
|---|---|
| 57. | |
| 58. | Latch Release |
| 59. | |
| 60. | Wheels |
| 61. | |
| 62. | Reflective Elements |
| 63. | |
| 64. | Prop Member |
| 65. | |
| 66. | |
| 66. | |
| 67. | |
| 68. | Wrap Portion |
| 69. | |
| 70. | |
| 71. | |
| 72. | |
| 73. | |
| 74. | |
| 75. | |
| 76. | |
| 77. | |
| 78. | |
| 79. | |

We claim:

1. A vehicular storage system comprising:
a storage assembly having a bottom wall, a perimeter wall extending upwardly from said bottom wall, and a lid portion for selectively closing at least a portion of a compartment formed by said bottom wall and said perimeter wall; said storage assembly having a longitudinal axis and a lateral axis, said lateral axis being substantially perpendicular to said longitudinal axis; and
a mounting assembly coupleable to a vehicle, said mounting assembly facilitating removably mounting said storage assembly to the vehicle;
wherein said mounting assembly further comprises a skid member having grooves congruently adapted to a top surface of a bed of the vehicle; and
wherein said mounting assembly further comprises a pair of mounting members, each one of said pair of mounting members being coupleable to the skid member;
wherein said storage assembly further comprise a pair of receiving members positioned on said bottom wall, each one of said receiving members being selectively coupleable to an associated one of said pair of mounting members: each one of said pair of receiving members having a receiving member longitudinal axis, each one of said pair of receiving members being positioned such that the receiving member longitudinal axis is substantially parallel to said lateral axis of said storage assembly; and
wherein said storage assembly further comprises a pair of wheels, each one of said pair of wheels being positioned along one end of said storage assembly, each one of said pair of wheels being positioned along an associated side of said storage assembly; each one of said pair of wheels being positioned to roll in a direction substantially parallel to said longitudinal axis of said storage assembly when said storage assembly is not mounted to the vehicle.

2. The vehicular storage system of claim 1 further comprising:
at least one latching means, each one of said latching means being positioned substantially within an associated end of said mounting assembly for selectively securing said storage assembly to said mounting assembly;
a latch release operationally coupled to said latching means for selectively releasing said latching means; and
at least one latch locking means for selectively locking said latching means, said at least one latch locking means being operationally connected to said pair of latching means.

3. The vehicular storage system of claim 2, wherein said at least one latching means has a first secured position and a second secured position whereby said storage assembly is positionable in a first position and a second position along said mounting member.

4. The vehicular storage system of claim 1, wherein each one of said mounting members further comprises a tapered leading edge.

5. The vehicular storage system of claim 1, wherein said storage assembly further comprises at least one reflective element.

6. The vehicular storage system of claim 1, wherein said storage assembly further comprises a pair of reflective elements, each one of said pair of reflective elements being positioned adjacent to an associated corner of said storage assembly.

7. The vehicular storage system of claim 1, wherein said storage assembly further comprises:
an aperture extending through a portion of said perimeter wall, and
a door operationally coupled to said perimeter wall, said door being adapted for selectively closing said aperture.

8. The vehicular storage system of claim 7, further comprising a door latching system for selectively securing said door.

9. The vehicular storage system of claim 1, wherein said storage assembly further comprises a polymeric material.

10. The vehicular storage system of claim 7, wherein said storage assembly further comprises:
a pair of reflective elements, each one of said pair of reflective elements being positioned adjacent to an associated corner of said storage assembly;
an aperture extending through a portion of said perimeter wall, a door operationally coupled to said perimeter wall, said door being adapted for selectively closing said aperture; and a door latching system for selectively securing said door.

11. The vehicular storage system of claim 10, wherein said storage assembly further comprises:
a handle member positioned along an end of said storage assembly opposite of said pair of wheel members.

12. The vehicular storage system of claim 1, wherein said lid portion further comprises:
a top wall operationally coupled to said perimeter wall;
a top aperture positioned through said top wall;
a lip portion extending upwardly from said top wall adjacent to said top aperture; a seal member positioned along said lip portion; and
a lid member pivotally coupled to said storage assembly.

13. The vehicular storage system of claim 12, wherein said lid portion further comprises a channel member positioned in said top wall adjacent to said lip portion.

14. The vehicular storage system of claim 13 further comprising a prop member positionable between said lid member and said storage assembly.

15. The vehicular storage system of claim 1, further comprising a wrap portion, said wrap portion being positioned on an exterior surface of said storage assembly.

16. A vehicular storage system comprising:
- a storage assembly having a bottom wall, a perimeter wall extending upwardly from said bottom wall, and a lid portion for selectively closing at least a portion of a compartment formed by said bottom wall and said perimeter wall;
- a mounting assembly coupleable to a vehicle, said mounting assembly facilitating removably mounting said storage assembly to the vehicle;
- wherein said mounting assembly further comprises a pan of mounting members, each one of said pair of mounting members being coupleable to the bed of the vehicle;
- wherein said mounting assembly further comprises a pair of skid members, each one of said pair of skid members being positioned on said bottom wall of said storage assembly, each one of said pair of skid members having a skid member longitudinal axis, each one of said skid members being positioned such that said skid member longitudinal axis is substantially parallel to the lateral axis of said storage assembly, each one of said pair of skid members being positioned adjacent to but not in contact with an associated one of said pair of receiving members, each skid member being congruently adapted to a top surface of a bed of the vehicle;
- wherein said storage assembly further comprises a pair of receiving members positioned on said bottom wall, each one of said receiving members being selectively coupleable to an associated one of said pair of mounting members;
- at least one latching means, each one of said latching means being positioned substantially within an associated end of said mounting assembly for selectively securing said storage assembly to said mounting assembly;
- a latch release operationally coupled to said latching means for selectively releasing said latching means;
- at least one latch locking means for selectively locking said latching means, said at least one latch locking means being operationally connected to said pair of latching means;
- said at least one latching means has a first secured position and a second secured position whereby said storage assembly is positionable in a first position and a second position along said mounting member;
- wherein each one of said mounting members further comprises a tapered leading edge;
- a pair of wheels, each one of said pair of wheels being positioned along one end of said storage assembly, each one of said pair of wheels being positioned along an associated side of said storage assembly; each one of said pair of wheels being positioned to roll in a direction substantially parallel to said longitudinal axis of said storage assembly when said storage assembly is not mounted to the vehicle;
- a pair of reflective elements, each one of said pair of reflective elements being positioned adjacent to an associated corner of said storage assembly;
- said storage assembly further comprises a polymeric material;
- wherein said storage assembly further comprises: a pair of reflective elements, each one of said pair of reflective elements being positioned adjacent to an associated corner of said storage assembly;
- an aperture extending through a portion of said perimeter wall,
- a door operationally coupled to said perimeter wall, said door being adapted for selectively closing said aperture;
- a door latching system for selectively securing said door;
- wherein said lid portion further comprises: a top wall operationally coupled to said perimeter wall; a top aperture positioned through said top wall;
- a lip portion extending upwardly from said top wall adjacent to said top aperture;
- a seal member positioned along said lip portion;
- a lid member pivotally coupled to said storage assembly;
- a channel member positioned in said top wall adjacent to said lip portion;
- a prop member positionable between said lid member and said storage assembly; and
- a wrap portion, said wrap portion being positioned on an exterior surface of said storage assembly.

17. The vehicular storage system of claim 1, wherein said mounting assembly further comprises a pair of skid members, each one of said pair of skid members being positioned on said bottom wall of said storage assembly, each one of said pair of skid members having a skid member longitudinal axis, each one of said skid members being positioned such that said skid member longitudinal axis is substantially parallel to the lateral axis of said storage assembly, each one of said pair of skid members being positioned adjacent to but not in contact with an associated one of said pair of receiving members.

18. A vehicular storage system comprising:
- a storage assembly having a bottom wall, a perimeter wall extending upwardly from said bottom wall, and a lid portion for selectively closing at least a portion of a compartment formed by said bottom wall and said perimeter wall; said storage assembly having a longitudinal axis and a lateral axis, said lateral axis being substantially perpendicular to said longitudinal axis;
- a mounting assembly coupleable to a vehicle, said mounting assembly facilitating removably mounting said storage assembly to the vehicle;
- wherein said mounting assembly further comprises a pair of mounting members, each one of said pair of mounting members being congruently adapted to a top surface of a bed of vehicle as well as coupleable to the bed of the vehicle; and
- wherein said storage assembly further comprise a pair of receiving members positioned on said bottom wall, each one of said receiving members being selectively coupleable to an associated one of said pair of mounting members; each one of said pair of receiving members having a receiving member longitudinal axis, each one of said pair of receiving members being positioned such that the receiving member longitudinal axis is substantially parallel to said lateral axis of said storage assembly; and
- wherein said mounting assembly further comprises a pair of skid members, each one of said pair of skid members being positioned on said bottom wall of said storage assembly, each one of said pair of skid members having a skid member longitudinal axis, each one of said skid members being positioned such that said skid member longitudinal axis is substantially parallel to the lateral axis of said storage assembly, each one of said pair of skid members being positioned adjacent to but not in contact with an associated one of said pair of receiving members.

19. The vehicular storage system of claim 18 wherein each one of said pair of skid members has a bottom surface for abutting a surface of the vehicle bed, said bottom surface being crenulated.

* * * * *